(12) United States Patent
Isgar

(10) Patent No.: US 10,999,446 B1
(45) Date of Patent: May 4, 2021

(54) COMMUNITY REPORTING SYSTEM

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 0 days.

(21) Appl. No.: 16/787,801

(22) Filed: Feb. 11, 2020

Related U.S. Application Data

(63) Continuation-in-part of application No. 16/287,529, filed on Feb. 27, 2019, now Pat. No. 10,601,999, which is a continuation of application No. 16/020,831, filed on Jun. 27, 2018, now Pat. No. 10,257,365.

(60) Provisional application No. 62/609,464, filed on Dec. 22, 2017.

(51) Int. Cl.
| | |
|---|---|
| *G06F 15/16* | (2006.01) |
| *H04M 11/04* | (2006.01) |
| *H04W 4/18* | (2009.01) |
| *G06F 16/29* | (2019.01) |
| *G06Q 50/00* | (2012.01) |

(52) U.S. Cl.
CPC ............ *H04M 11/04* (2013.01); *G06F 16/29* (2019.01); *G06Q 50/01* (2013.01); *H04W 4/185* (2013.01)

(58) Field of Classification Search
USPC .................. 709/204, 201, 202, 203, 231
See application file for complete search history.

(56) References Cited

U.S. PATENT DOCUMENTS

| | | |
|---|---|---|
| 8,144,232 B2 | 3/2012 | Larson et al. |
| 2011/0035284 A1 | 2/2011 | Moshfeghi |
| 2013/0110631 A1 | 5/2013 | Mitchell et al. |

*Primary Examiner* — Lan Dai T Truong
(74) *Attorney, Agent, or Firm* — Schmeiser, Olsen & Watts LLP

(57) ABSTRACT

A community reporting system is described. The system includes a computer server and a plurality of user computing devices. The system operates to receive from the user computing device a signal having community condition information including a community condition in a corresponding community. The community condition information is geotagged. The system automatically accumulates the community condition information and aggregates the community condition information within the memory of the computer server to store the accumulated and aggregated information corresponding to the community information in which the community condition occurred. The system maintains the community condition information stored in the memory of the computer server. The system also operates to send alerts to user computing devices of the system regarding community conditions corresponding to the stored community condition information within the server.

14 Claims, 15 Drawing Sheets

COMMUNITY REPORTING SYSTEM

CROSS REFERENCE TO RELATED APPLICATION[S]

This application is a continuation-in-part of U.S. Patent Application entitled "COMMUNITY REPORTING SYSTEM," Ser. No. 16/287,529, filed Feb. 27, 2019, which is a continuation of U.S. Patent Application entitled "COMMUNITY REPORTING SYSTEM," Ser. No. 16/020,831, filed Jun. 27, 2018, which claims priority to U.S. Provisional Patent Application entitled "NEIGHBORHOOD REPORTING SYSTEM," Ser. No. 62/609,464, filed Dec. 22, 2017, the disclosures of which are hereby incorporated entirely herein by reference.

BACKGROUND OF THE INVENTION

Technical Field

This invention relates to a community reporting system, and particularly to a community reporting system using mobile computing devices to submit geotagged or location identified reports on community conditions and interactions for aggregation and reporting to interested parties.

State of the Art

Neighborhoods and communities often have community conditions that may include common concerns such as hazards, unsafe conditions, or nuisances or positive activities such as celebrations, community sales, well-kept property and the like. Citizens are typically the first to encounter these community conditions but lack a responsive or modern system for collecting, analyzing and reporting such information. Accordingly, there is a need for a system that allows citizens in a neighborhood or community to actively participate in the collection and validation of information and/or interact with the collected information.

SUMMARY OF EMBODIMENTS

Disclosed is a community reporting system comprising: a computer server having a memory for storing community condition information and community information; and a user computing device coupled to the computer server, the user computing device configured to tag community condition information, wherein the computer server is programmed to: receive from the user computing device a signal having tagged community condition information including a community condition in a corresponding community; automatically send the tagged community condition information to other user computing devices coupled to the server that are within a predetermined population selected by the user computing device and automatically accumulate the tagged community condition information and aggregate the positive community condition information within the memory to store the accumulated and aggregated information corresponding to the community information in which the community condition relates in response to processing the geotagged community condition information; maintain the community condition information stored in the memory of the computer server; and automatically generate a report of community conditions in response to receiving a signal requesting a report, wherein the report segregates the community conditions based on the geotagged community condition information.

An embodiment includes a community reporting system comprising: a computer server having a memory for storing community condition information and community information; and a plurality of user computing devices coupled to the computer server, the user computing configured to assign a location to community condition information, wherein the computer server is programmed to: receive from more than one user computing device signals having community condition information including a plurality of community conditions within a corresponding community, wherein each community condition is one of a positive community condition or a negative community condition; automatically accumulate the community condition information from the more than one user computing device and aggregate the positive community condition information and the negative community condition information within the memory to store the accumulated and aggregated information corresponding to the location information in which the community condition occurred in response to processing the geotagged community condition information from each of the user computing devices; maintain the community condition information stored in the memory of the computer server; and automatically generate a report of community conditions in response to receiving a signal requesting a report, wherein the report segregates the community conditions based on the location associated with the community condition information.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

The application as described herein may be used as a neighborhood or community application to take or upload photographs and data (pictures and/or videos, text messages, etc.) of community conditions that may include questionable activity, nuisances, unsafe conditions, or general information about the community. Examples of such include, but are not limited to, fallen road signs, dead trees or shrubbery, graffiti, potholes and other potential nuisances. Further, the community application may be used to take or upload photographs and data (pictures and/or videos, text messages, etc.) of other types of community conditions that include, without limitation, activities, service projects, community yard sales, clean well-kept property conditions, community celebrations and the like.

Figure 1:
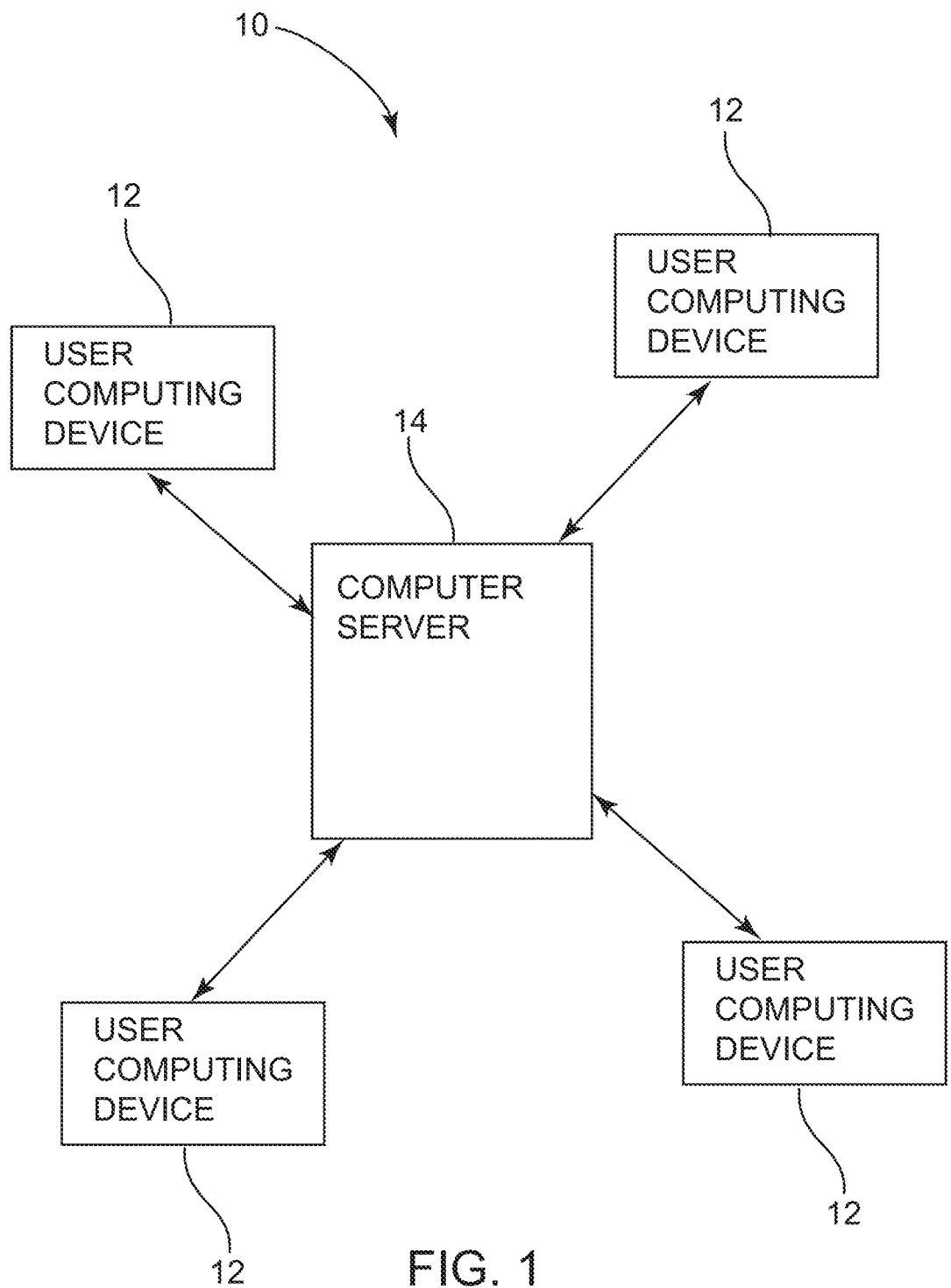
FIG. 1 is a diagrammatic view of a community reporting system in accordance with an embodiment.

Referring to the drawings, FIG. 1 depicts an embodiment of a community reporting system 10. The system 10 may include user computing devices 12 and a computer server 14, wherein the user computing devices 12 are coupled to the computer server 14. This coupling may be a network connection, such as through an internet connection, wherein the user computing devices 12 may communicate with and receive communication from the server 14. The user computing devices 12 may be mobile computing devices, such as, but not limited to, smartphones, tablets, wearable technology and the like. Some community systems 10 may be established to allow anonymous reporting and other community systems may be established to not allow anonymous reporting. In embodiments that allow anonymous reporting, the user computing devices 12 may have an option to report a community condition anonymously.

Figure 2:
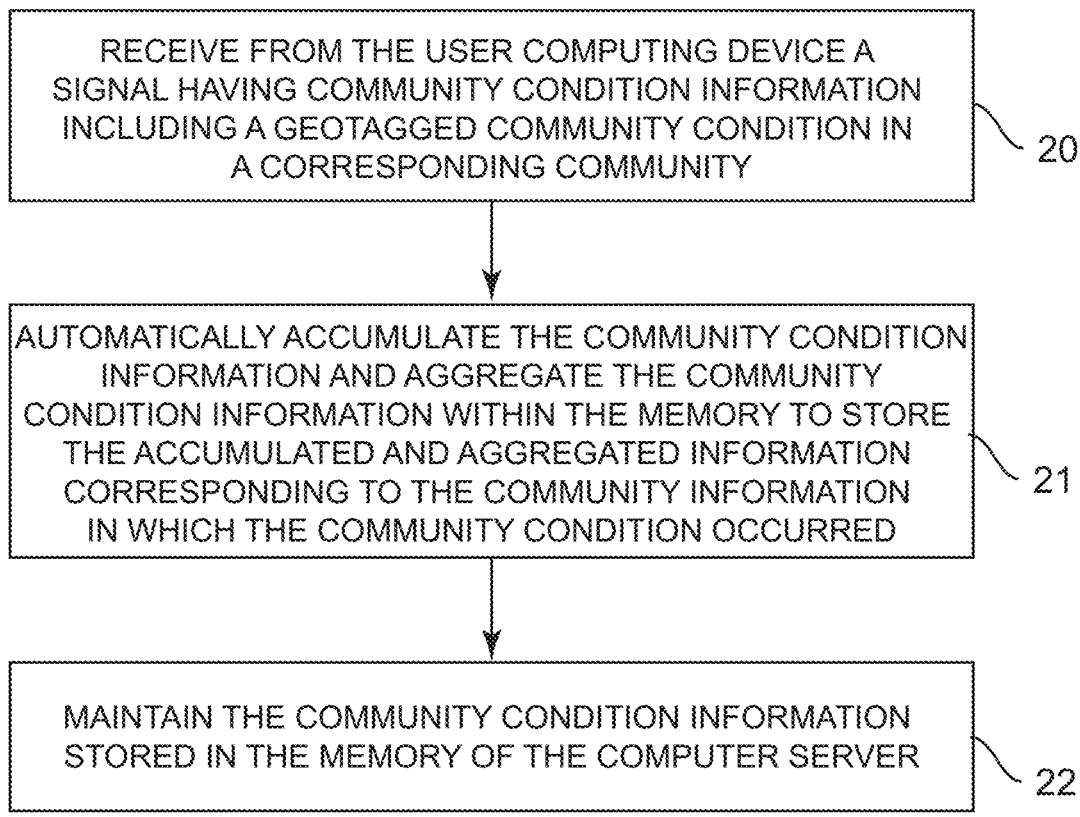
FIG. 2 is a flow chart of programmed steps of a computer server of a community reporting system in accordance with an embodiment.

The computer server 14 may include a memory storing community condition information including a description of the community condition and may include photos and videos corresponding to a reported community condition. The user computing device 12 may be coupled to the computer server 14, and, referring to FIG. 2, the computer server 14 may be programmed to receive from the user computing device 12 a signal having community condition information, which may include a geotagged community condition in a corresponding community (Step 20); automatically accumulate the community condition information and aggregate the community condition information within the memory to store the accumulated and aggregated information corresponding to the community information in which the community condition occurred (Step 21), which may be done in response to processing the geotagged community condition information; and maintain the community condition information stored in the memory of the computer server 14 (Step 22).

In embodiments, the community condition information may be geotagged with information provided by the global positioning system device of the user computing device prior to receiving the community condition information by the computer server. In other embodiments, the community condition information may be geotagged manually by providing an address of the community condition. In some embodiments, photos and videos may be added to a reported community condition in order to help interpret and identify the reported community condition, which may be accomplished using a camera of the user computing device 12.

Further, the computer server 14 may be further programmed to aggregate information based on the geotagged community condition information. This allows for a collection of community condition information and helps a community or neighborhood to identify if there are repeat offenders or trouble areas in the community or neighborhood that need to be addressed. It allows for further action to be taken by involving the community in the discovery of community conditions and further can include the community to address the concerns brought out in the reported community condition. Additionally, this aggregation of information may be sent to municipalities in order to effectively handle community conditions that need municipality involvement. It may also be sent to community organizations, homeowners associations, real estate agents and the like.

The computer server 14 may be further programmed to automatically generate a report of community conditions in response to receiving a signal requesting a report from a responsible party, wherein the report segregates the community conditions based on the geotagged community condition information. The responsible party may be an individual such as, but not limited to a councilman, a parent, a principal, an employer, a homeowners association chair, and the like; or it may be an entity such as, but not limited to a local governing entity, a homeowners association, neighborhood patrol, a contracted maintenance worker, and the like. The responsible party may be any individual or entity that is responsible for or has authority for addressing the community condition and resolving any issues related thereto. For example, the report may be requested from a community association in order to identify whether notices under community agreements need to be made, whether certain additional assessments need to be made, and the like. In some embodiments, the reporting may allow users to select certain report information, such as, but not limited to, type of community conditions, location of community conditions, number and time of community conditions, and the like. The reports may be requested from a user computing device 12.

The reporting features of the system 10 may include real-time reporting to a responsible party, where designated, wherein the real-time information is updated with reports submitted, particularly updating, in real time, previously reported community conditions with newly submitted reports on the same condition. This real-time reporting may be an alert sent to a device of the responsible party. Additionally, the system 10 may operate to notify or alert all users of the system 10 of reported community conditions. In some embodiments, the alert may be automatically sent to a user computing device 12 of a community condition of a corresponding community when the user computing device 12 has a location adjacent to, approaching, and/or within the corresponding community, as determined by the global positioning system device.

Figure 3A:
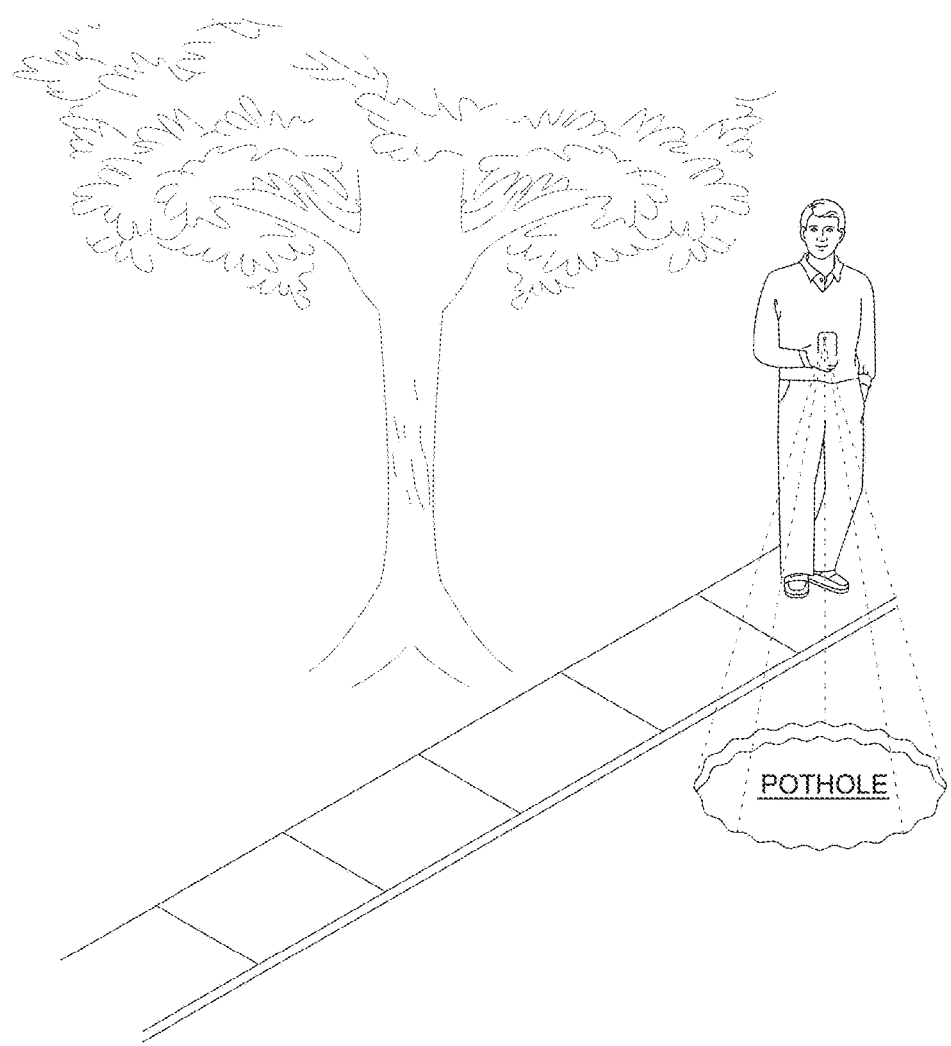
FIG. 3A is a perspective view of a community reporting system depicting reporting of a pothole in accordance with an embodiment.
Figure 3B:
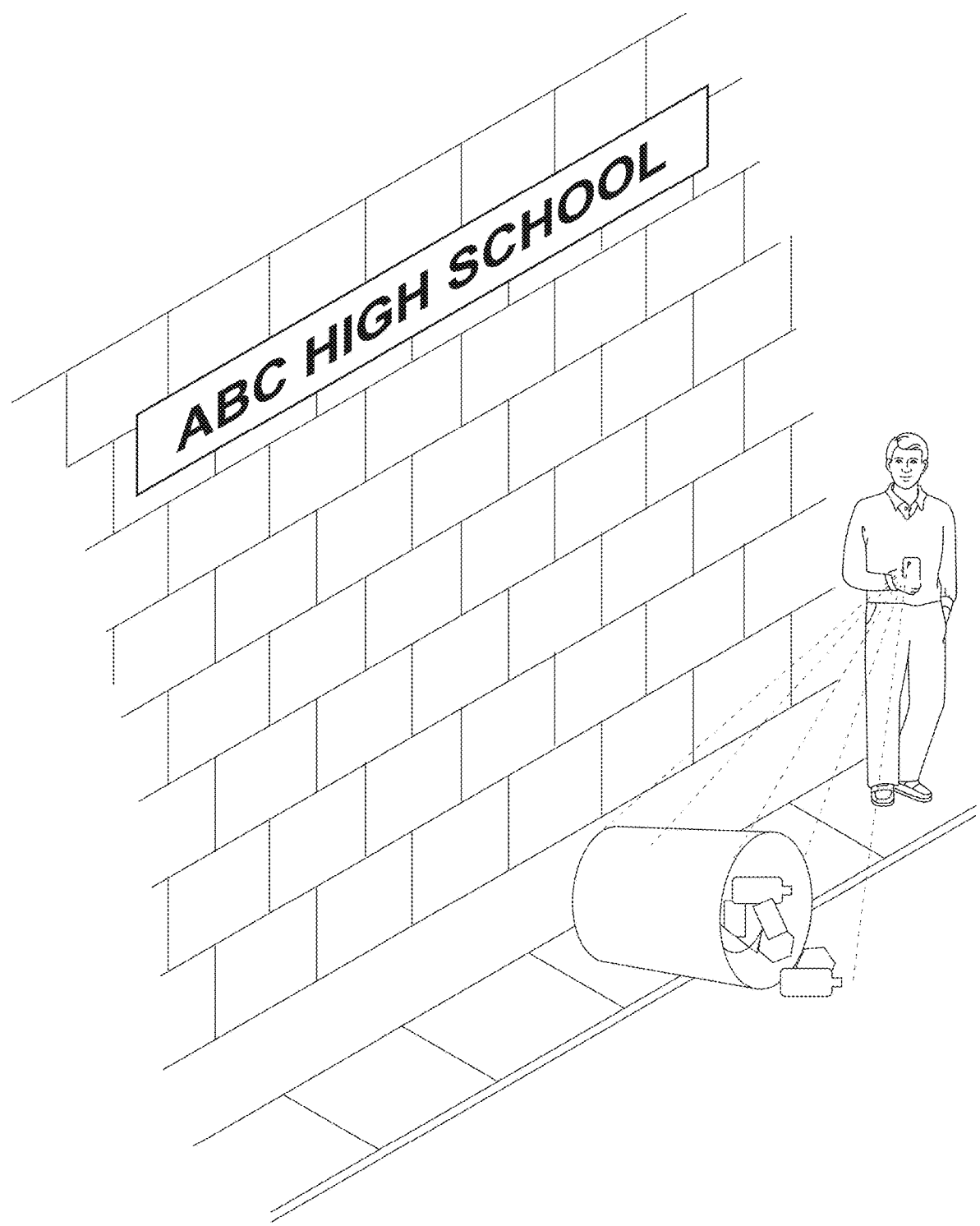
FIG. 3B is a perspective view of a community reporting system depicting reporting of an overturned trashcan in accordance with an embodiment.
Figure 3C:
FIG. 3C is a perspective view of a community reporting system depicting reporting of graffiti applied to a wall in accordance with an embodiment.

In embodiments, the system 10 includes the server programmed to aggregate the information based on GPS location of the community conditions reported in order to establish a community circle, or area, and thereby aggregate the reports within these community circles. For example, and without limitation, community circles may include a neighborhood, a homeowners association, a town, a city, a school, a shopping center, a park, a sports venue, a store and the like. For example, FIG. 3A depicts the system 10 utilized in a community that is a neighborhood with a user reporting a pothole; FIG. 3B depicts the system 10 utilized in a community that is a school with a user reporting an overturned trashcan; and FIG. 3C depicts the system 10 utilized in a community that is a town, city, school, shopping center, park, sports venue, store or the like with a user computing device reporting graffiti.

The server 14 may be programmed to interpret the community conditions information to suggest action and timing of action for addressing the reported community condition. This may include identifying the time when a user reports the community condition and identifying a likely time for addressing the community condition when most convenient to the community. The server 14 may also be programmed to prioritize what community condition should receive higher priority over other reported community conditions. The priority may be established based on frequency of the reports, the number of reports received, type of community condition, and the like. It will be understood that embodiments of the system 10 are not intended to replace emergency reporting systems, such as, but not limited to 911.

The application operated on the computer server 14 provides a way to blow the whistle on community conditions that the local governing entity may not be aware of or may be ignoring, or general information about the well-being of the neighborhood or community. The application may also provide an easier way for citizens to exercise their collective voice to alert the community and local authorities to interface with local governments or individuals throughout the neighborhood or community about problems and provide alerts on their mobile devices via the application. Application as used herein may include a mobile application and/or website.

In some embodiments, the system 10 may automatically rank community conditions. The ranking may be determined in response to the number of reports of the same community condition, thereby increasing the ranking to indicate priority of community conditions reported. The ranking may be any type of ranking including number ranking, letter ranking, star ranking, and the like, to designate which community conditions are more important to the community of users reporting community conditions.

Additionally, in some embodiments, the system 10 may include a point system, wherein each user is provided a predetermined number of points that can be used to report within a predetermined time period, such as, but not limited to, 100 points in a day, wherein each report of a community condition requires a certain number of points to report, thereby limiting how many reports a single user can make in the predetermined time period, and further avoid driving up a ranking of a community condition that is truly not being reported by different users. In other embodiments, the system 10 may include the computer server 14 being further programmed to identify whether a user has already reported the community condition and not adjusting the ranking of the community condition. The system may also adjust the ranking of the community condition if the same user reports it again outside of a predetermined amount of time from the first reported community condition.

Geotagging may be used to add geographical identification, such as a geotagged photograph or video, to identify common problems and/or concerns and to develop useful databases for neighborhoods and communities. Geotagging relies on global positioning system (GPS) technology. The application can accumulate data and relate it to known information to generate reports and to provide intelligent interpretation of neighborhood and community information, i.e. an intelligent neighborhood patrol.

The application may empower citizens to draw attention to the "squeaky wheel" to get services and/or responses to community problems. The application utilizes photography to accumulate common information and aggregate it for a specific area. The application may empower citizens to accumulate real-time, actionable data and not rely solely on often stale reports from public agencies. Public agencies may also benefit from this data to provide better services. This intelligent community patrol may integrate the data to determine trends and observations that may benefit community data collection and response.

The application allows citizens in a community to collaborate with one another to stand strong against the problems in their neighborhood or community. Through a shared feed for a specific neighborhood or community, citizens have the opportunity to upload photographs, videos and/or status updates about announcements, unusual occurrences or other information that is pertinent to that particular neighborhood or community. Certain announcements can also trigger alerts to community leaders or watch committees. This application is configured to harness the power of cell phones and other technology to influence action.

As shown in FIGS. 1-4E, the system 10 includes the server programmed to aggregate the information based on location of community conditions reported in order to establish a predetermined population such as a community circle or area, and thereby aggregate the reports within these predetermined populations. For example, and without limitation, predetermined populations may include, a neighborhood, a homeowners association, a town, a city, a school, a shopping center, a park, a sports venue, a store and the like. These predetermined populations may further be distinguished by other factors, such as age, work and the like. The system 10 may include user devices 12 that can operate to send community information in the form of a photo or video 20 and/or text 22. The user may select the submit soft button 24 in order to submit the community information to the system. In embodiments, the submit button 24 may provide the user the ability to send the community information to a predetermined population of users of the system 10, wherein the users receive the community information on their devices based on their preferences. In some embodiments, the submit button 24 may have portions, such as quadrants that can be selected by the user to send the post of community information to various types of predetermined populations. In some embodiments, selecting the submit button 24 provides options for the user to select one or more of the various types of predetermined populations. As previously discussed, the predetermined population may include, but is not limited to, a population within a block, within a neighborhood, within a zip code(s), within a town/city/county/state, and the like.

Figure 4A:
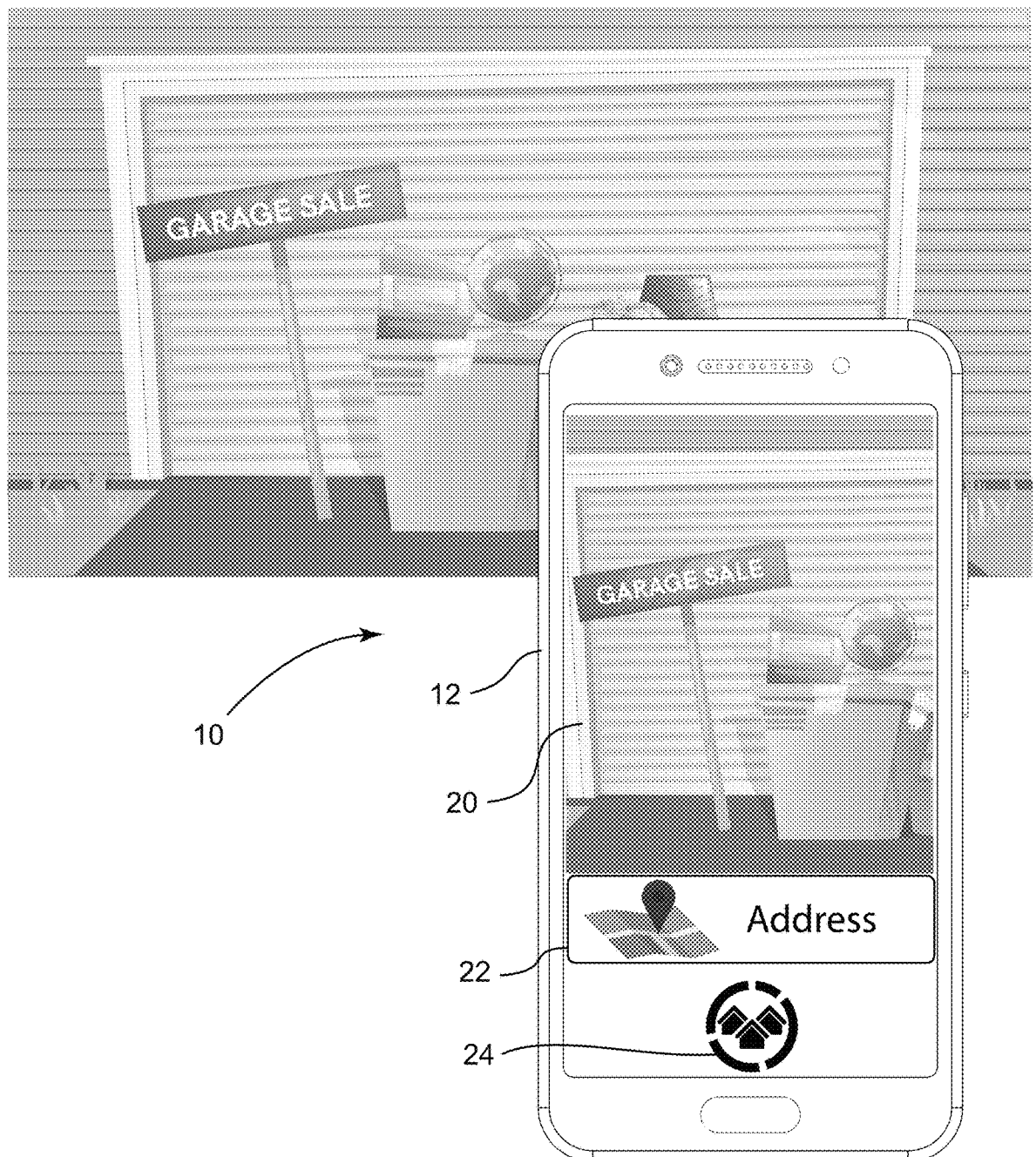
FIG. 4A is a perspective view of a community reporting system depicting reporting of a garage sale in accordance with an embodiment.
Figure 4B:
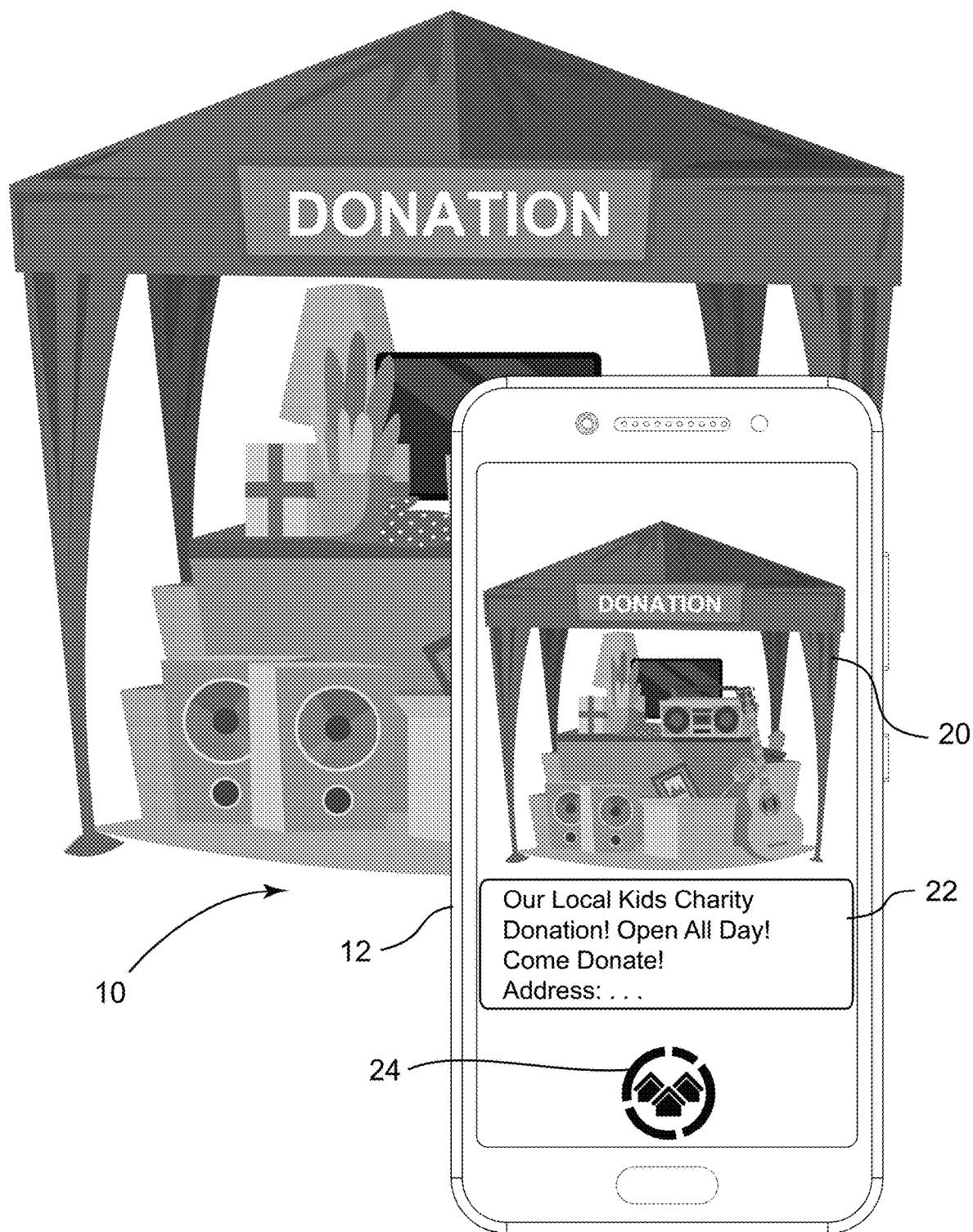
FIG. 4B is a perspective view of a community reporting system depicting reporting of a charitable donation event in accordance with an embodiment.
Figure 4C:
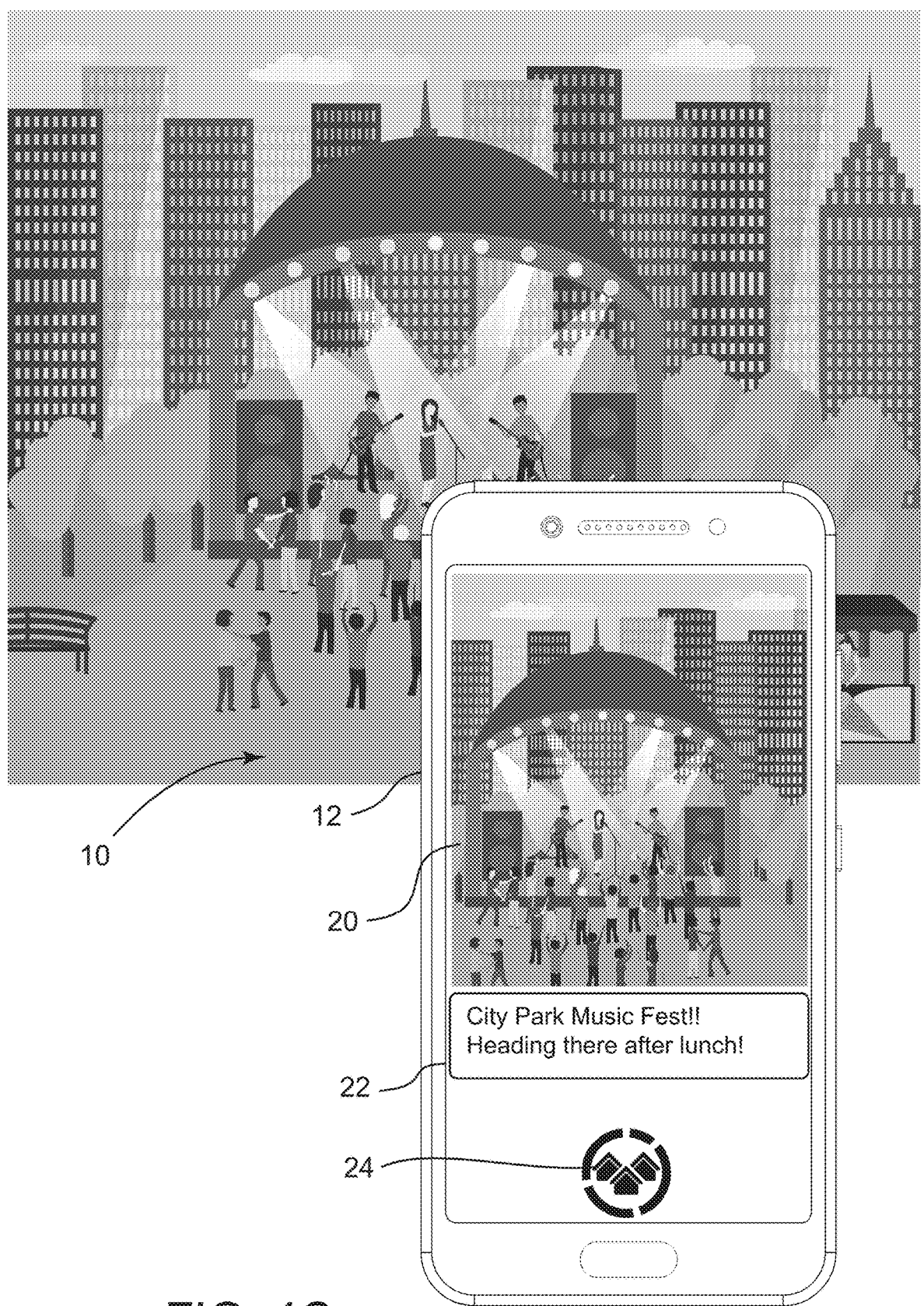
FIG. 4C is a perspective view of a community reporting system depicting reporting of a community celebration in accordance with an embodiment.
Figure 4D:
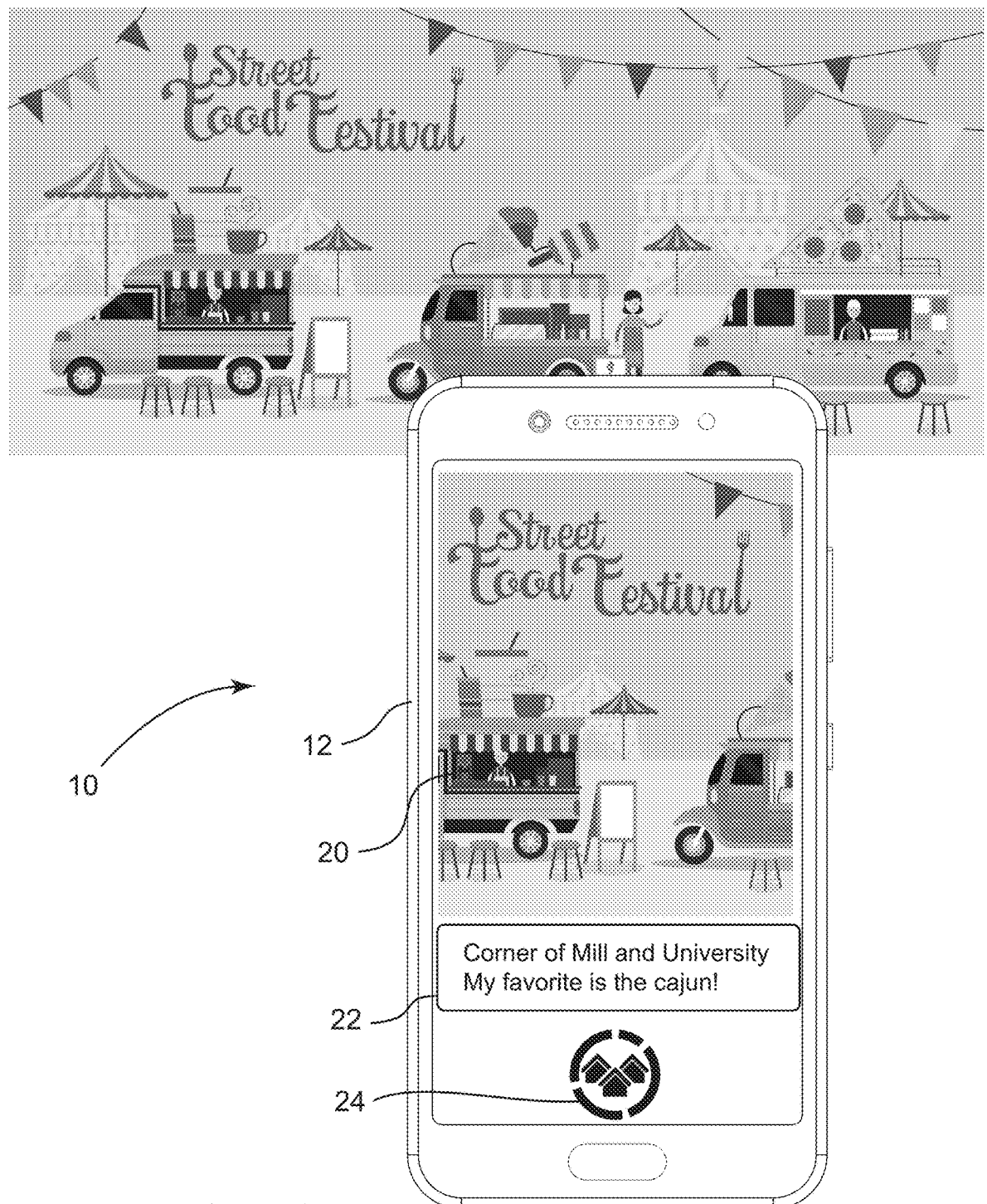
FIG. 4D is a perspective view of a community reporting system depicting reporting of a community social event in accordance with an embodiment.
Figure 4E:
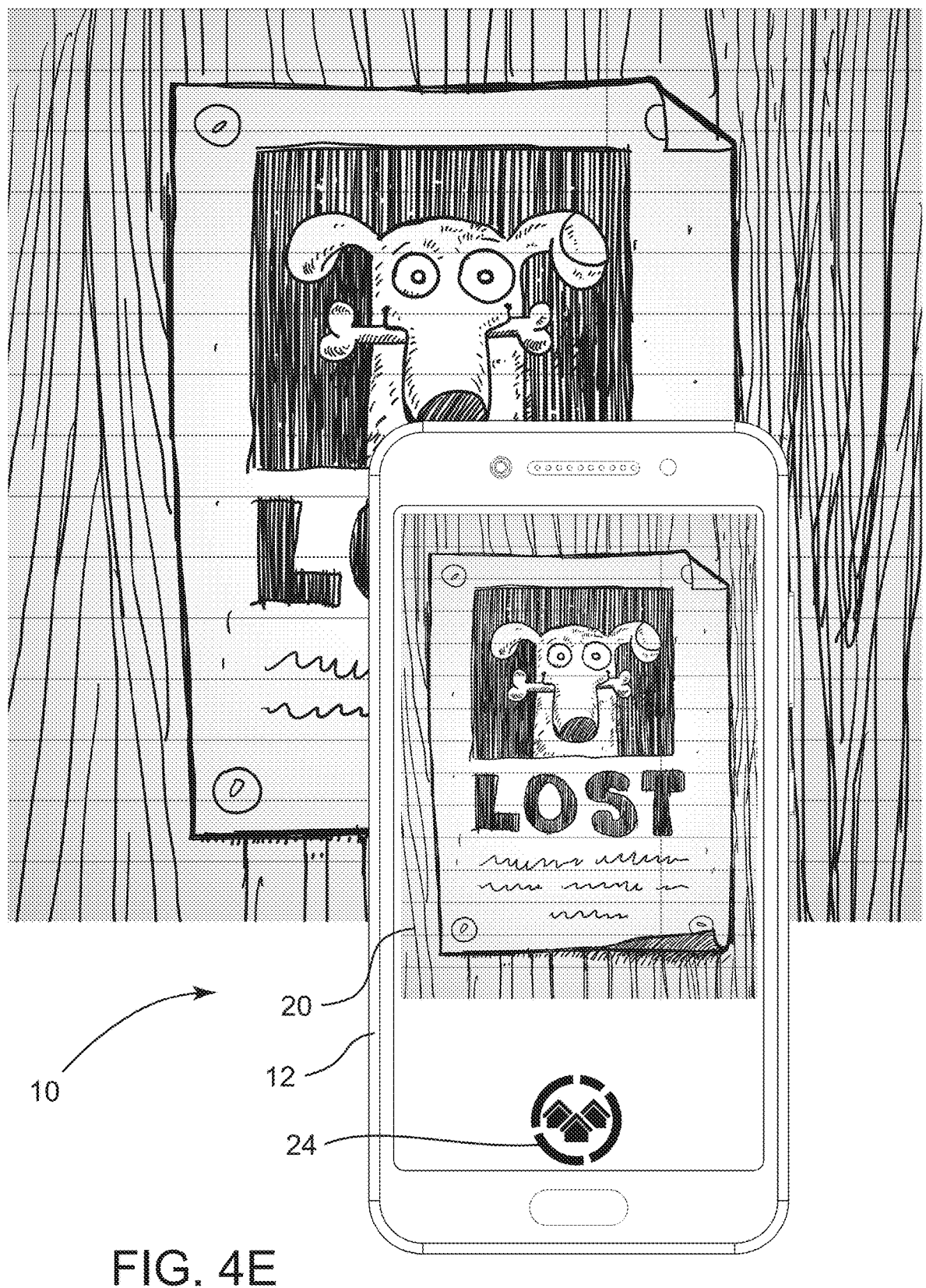
FIG. 4E is a perspective view of a community reporting system depicting reporting of a community flyer in accordance with an embodiment.

For example, FIG. 4A depicts the system 10 utilized in a community that is a neighborhood with a user reporting a garage sale, wherein a photo 20 and a geolocation or geotagged information 22 is sent out when the submit button 24 is selected. FIG. 4B depicts the system 10 utilized in a community with a user reporting a charitable donation event, wherein a photo 20 and user text and text address 22 is sent out when the submit button 24 is selected. FIG. 4C depicts the system 10 utilized in a community that is a town, city, school, shopping center, park, sports venue, store or the like with a user computing device reporting a community celebration, wherein a photo 20 and user text and text location 22 is sent out when the submit button 24 is selected. FIG. 4D depicts the system 10 utilized in a community that is a town, city, school, shopping center, park, sports venue, store or the like with a user computing device reporting a community event, such as, but not limited to, a food truck festival, wherein a photo 20 and user text and text location 22 is sent out when the submit button 24 is selected. FIG. 4E depicts the system 10 utilized in a community with a user reporting a community flyer, such as, but not limited to, a lost puppy flyer, wherein a photo 20 is sent out when the submit button 24 is selected. Each time the submit button 24 is pressed and the user selects the predetermined population to push the post to, the system 10 includes a server that is programmed to store the community condition information in a database maintained in the memory of the server, wherein the community condition information is collected and can be analyzed and can further be accessed by a user, such as through a user computing device 12 to obtain a report of the community condition information stored in the database and segregated based on location or other predetermined population factors. In other words, the posts a user makes on the user computing device 12 within the ecosystem provided by the system 10 are pushed to other user computing devices 12 within the ecosystem and are also stored in the memory of the server and accessible in reports as previously discussed in this disclosure.

In these embodiments, the system 10 operates to collect and aggregate data as described above with regard to community conditions that are problems but applied to community conditions and community condition information. This allows for more community information to spread by word of mouth by the multiple users within a community to draw attention to the positive occurrences and events within a community, as well as problems. Further still, the community reporting system 10 may provide reports in response to requests for reports and separate or segregate the information based at least in part on the location information or geotagged information of the report submitted by the system 10 regarding community conditions. This can operate as a form of "spreading the word" of positivity in a community for people to be involved with and to rally around.

Figure 5A:
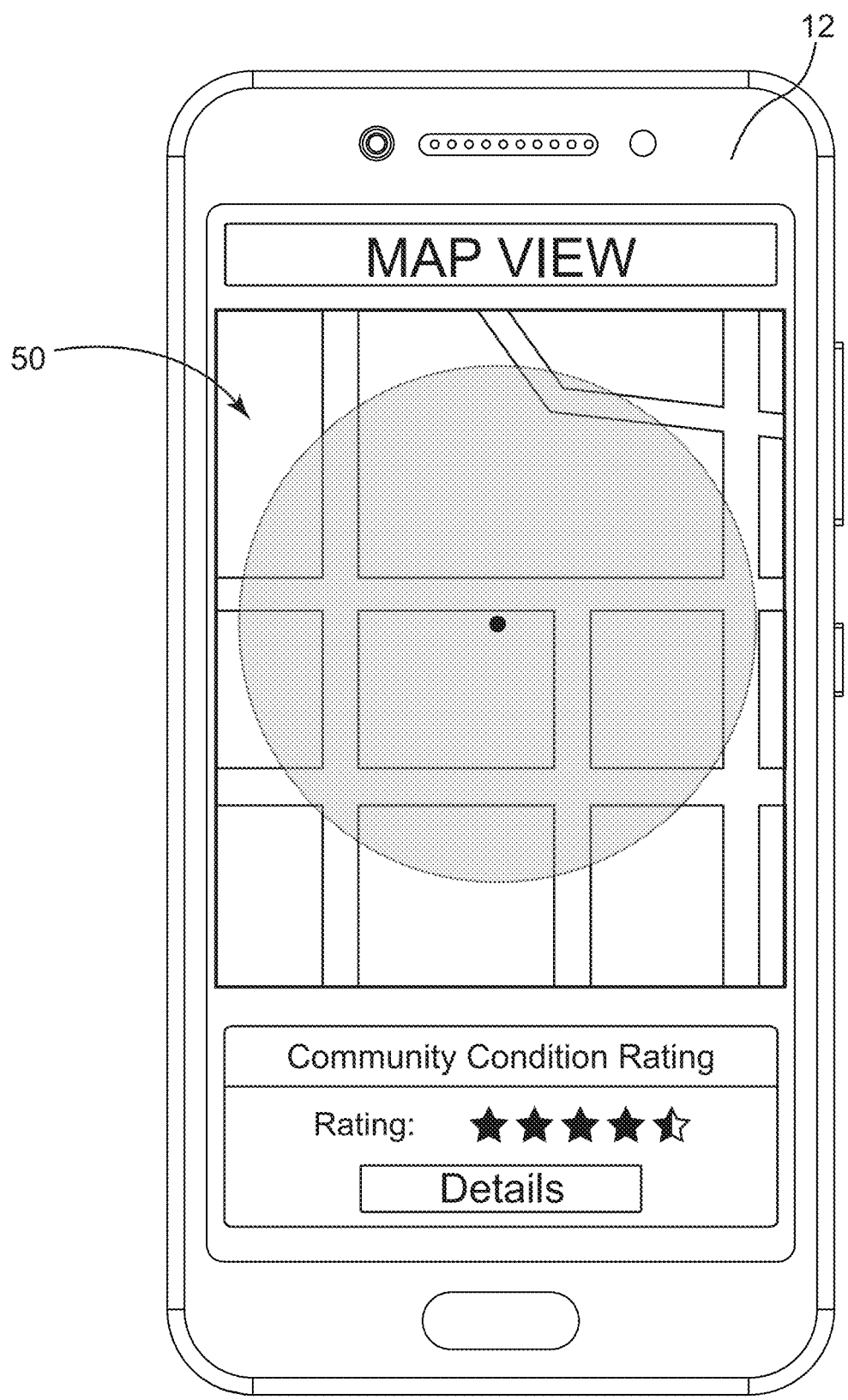
FIG. 5A is a view of a rating interface of a community reporting system in accordance with an embodiment.
Figure 5B:
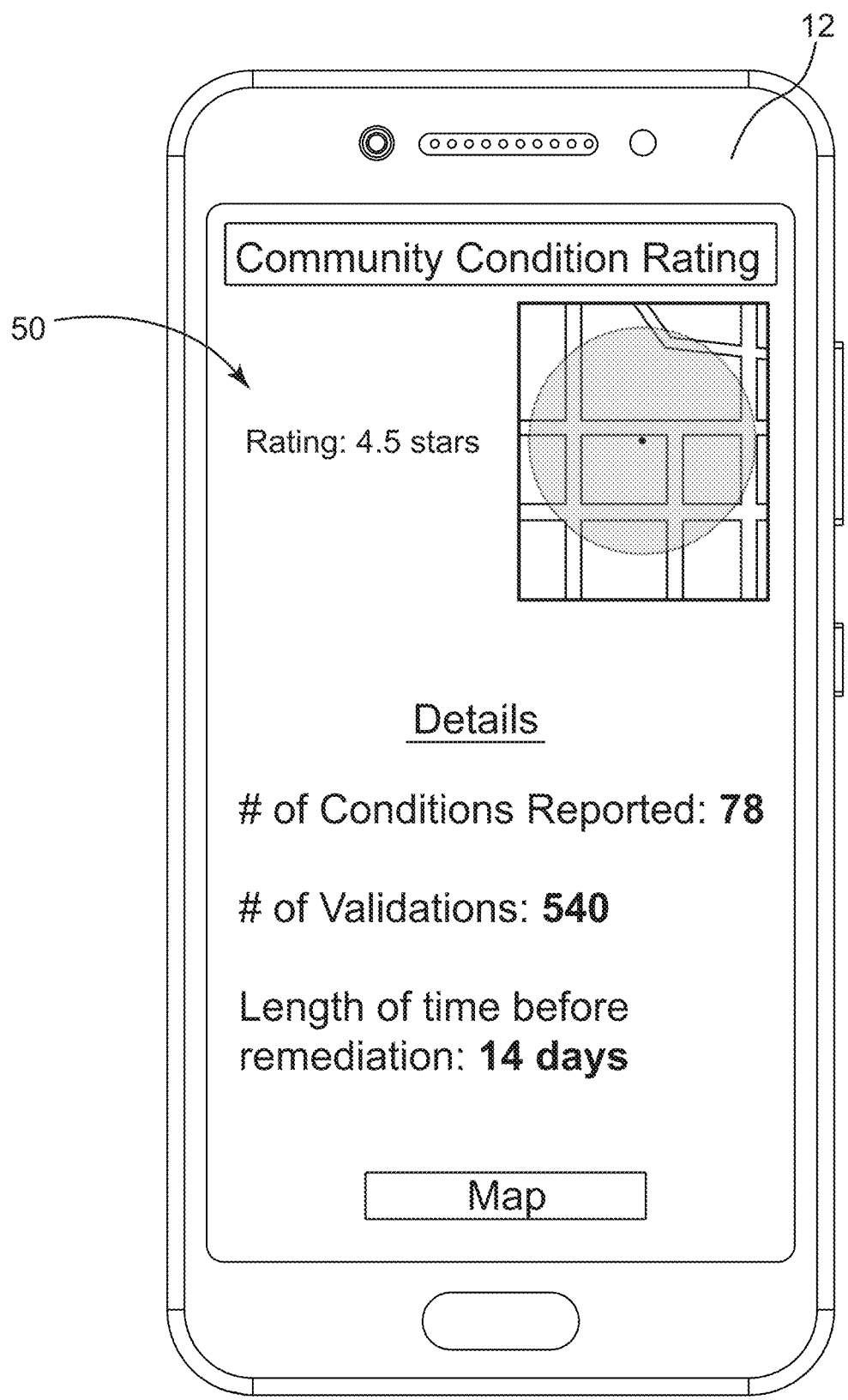
FIG. 5B is a view of a details interface of the rating interface of a community reporting system in accordance with an embodiment.

Referring further to the drawings, FIGS. 5A-5B is a depict an embodiment of the system 10 operated by a user computing device 12, wherein the user computing device depicts a rating interface 50. The rating interface 50 may depicts a map 52 in order to determine the location of where the user computing device 12 is located within a geographic area. This location may automatically be sent to the server 14. The server may be programmed to determine a radius, such as a one-mile radius or the like, around a user or receive a user defined radius based on user interest or user need. The server 14 may be further programmed to automatically determine a rating for the geographic area defined by the circular area around the user computing device location for a system or user defined radius. The server 14 may be programmed to determine a rating based on the data collected and aggregated by the system 10, such as, but not limited to, a number of conditions reported within the geographic area, a number of validations of such reported conditions, a length of time before remediation of the reported community conditions like cumulative time, average time, combinations thereof or the like. The details that are utilized by the system 10 to determine the rating may be viewed by selecting a details button on user computing device as shown in FIG. 5A, wherein the server 14 sends for display on the user computing device 12, the details interface of the rating interface 50, listing out specific details the server 14 analyzed in order to determine the rating. Further, the server 14 may be programmed to automatically remove outlier conditions that have extenuating circumstances, such as a fire, flood damage, owner health issues or the like. The determination of the rating may also include analyzing the number of positive community conditions and negative community conditions. This allows for the incorporation of all community conditions around a particular point and does not need to be concerned with city or town boundaries, particularly in metropolitan areas, where movement from one city to another can be done by crossing the street. This allows users of the system to get a more accurate understanding of a geographic region because the ratings are based on location and not based on city, school district or the like. The rating may be updated in near real-time as the user moves about a town or city, adjusting for the adjustment in the area based on the location of the user computing device. Additionally, this invention may be utilized by communities to limit the geographic area to predefined area, such as a defined homeowner community area, a neighborhood, a city or the like. The user computing device 12 may also have the ability to toggle between the community version (predefined area) report and the overall geographic region based on radius around the user computing device 12.

Figure 6:
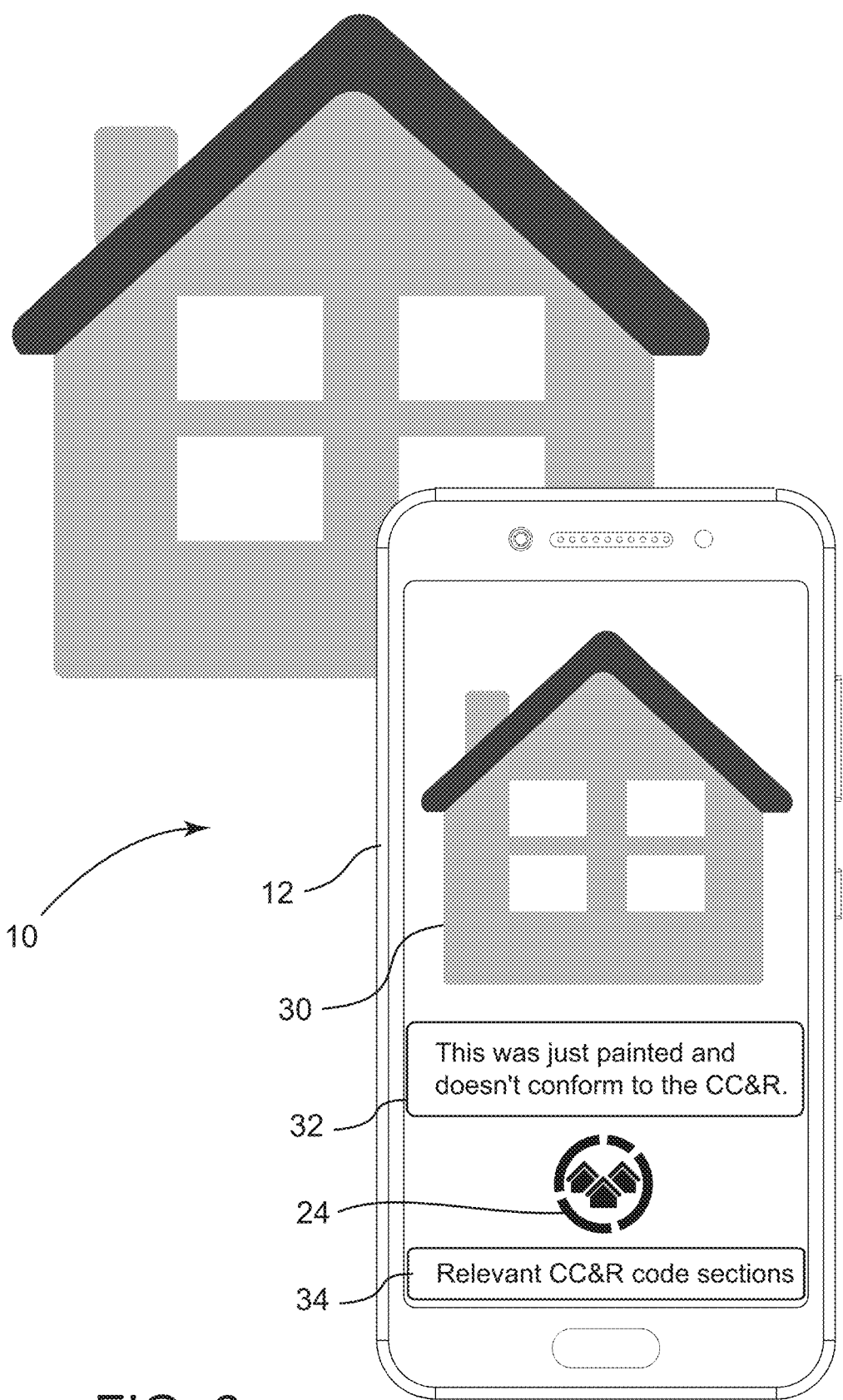
FIG. 6 is a view of an interface utilizing a community reporting system to report violations of community rules in accordance with an embodiment.

The system 10 may include interfacing with community rules, such as Covenants, Conditions, and Restrictions (CC&Rs), local statutes and/or the like, as depicted in FIG. 6. The system may include the user computing device 12 that may be utilized to report a violation of the community rules, such as CC&Rs depicted in FIG. 6. The interface may include uploading a photo 30, entering a comment 32 and having a submit button 24. Additionally, the system may be a learning system that utilizes learning in order to analyze the photo 30 and/or the text 32 in order to compare with community rules stored in the server 14. The server 14 may be programmed to automatically determine the location and the issue sent in to the system 10 and deliver code for display on the user interface of the user computing device 12, and a link for the user to access the relevant community rules, such as, but not limited to, button 34. This allows anyone reporting or viewing the reported violation to view the actual rule and determine if the issue is valid or, perhaps, the user may challenge its validity.

Figure 7A:
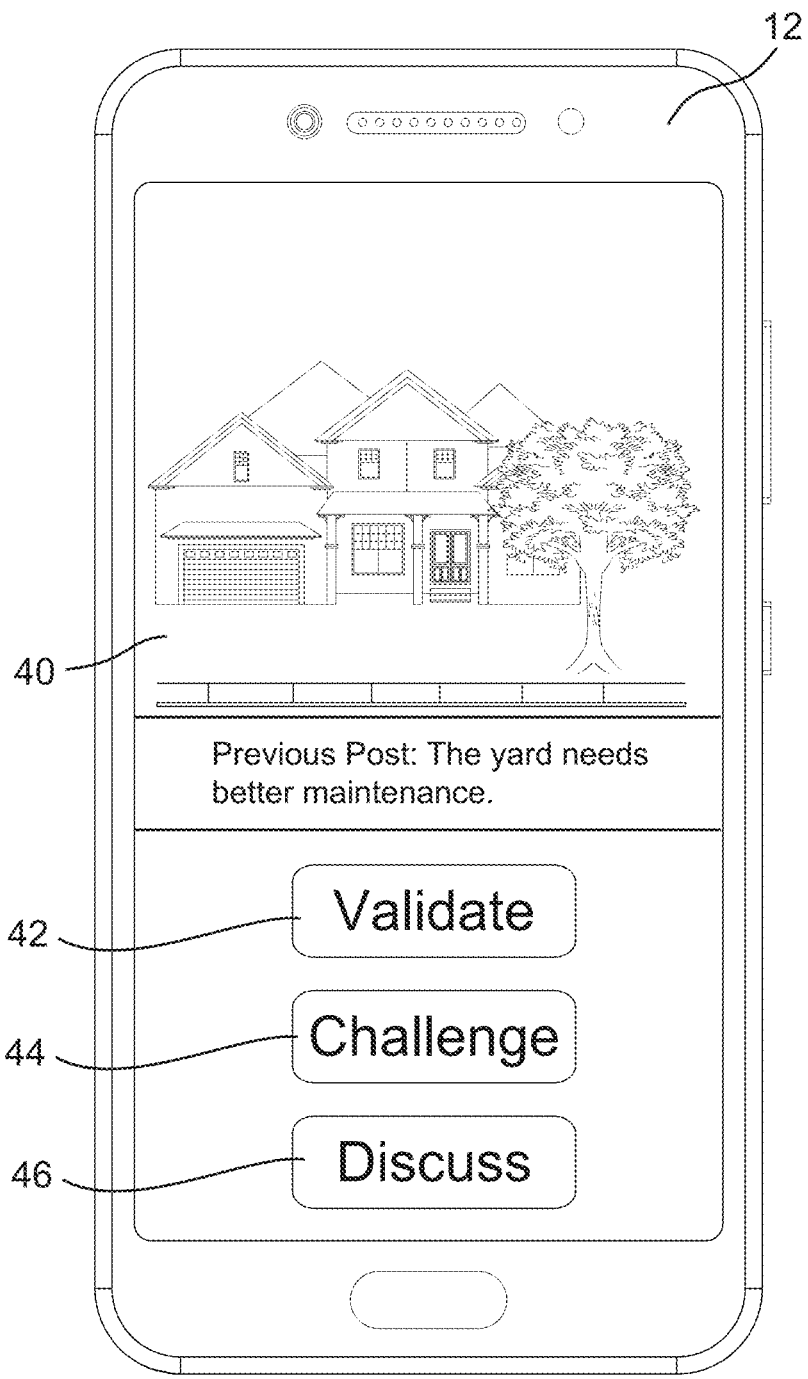
FIG. 7A is a view of an interface utilizing a community reporting system for validating, challenging or discussing a post stored in the system in accordance with an embodiment.
Figure 7B:
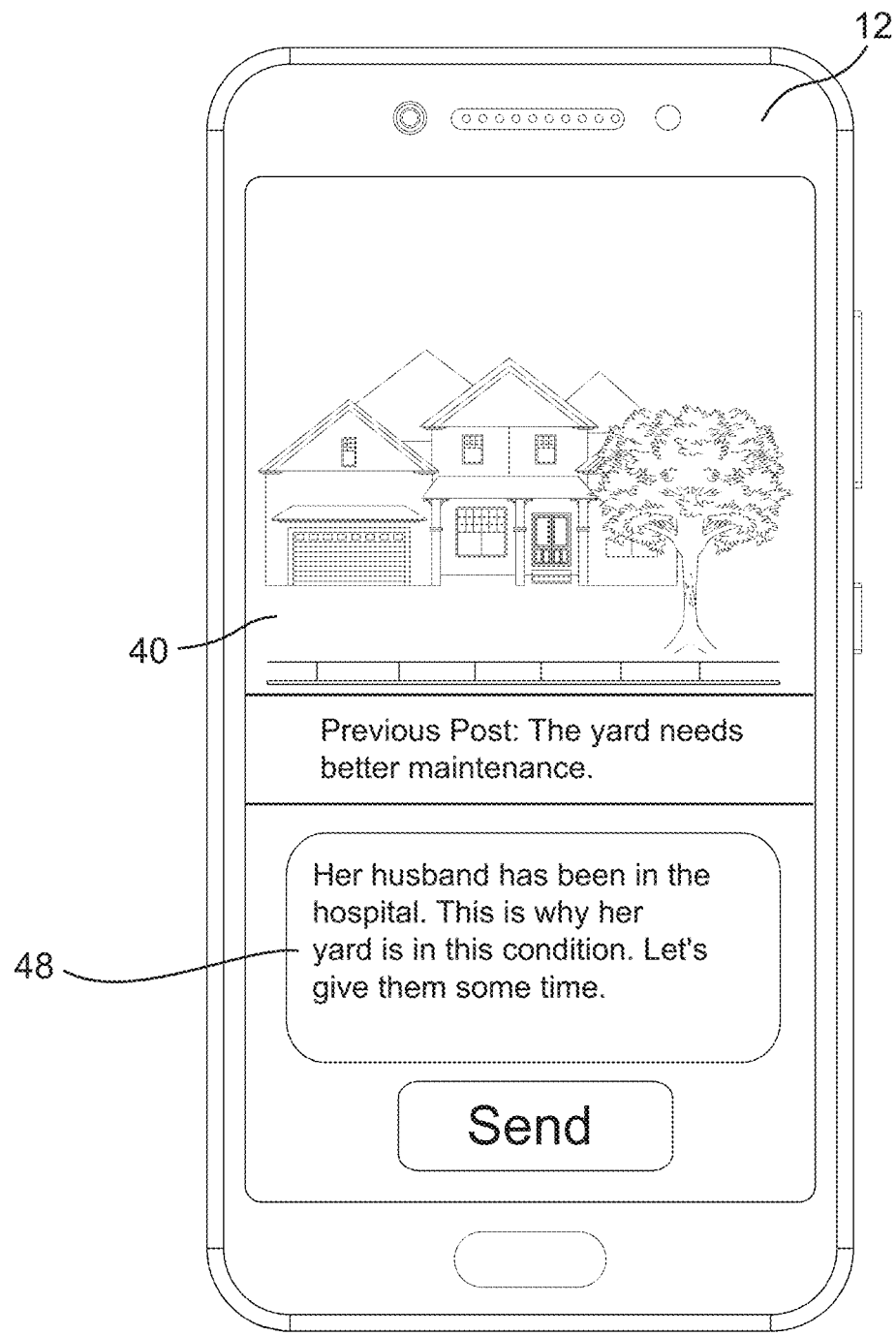
FIG. 7B is a view of an interface utilizing a community reporting system for discussing a post stored in the system in accordance with an embodiment.

Referring additionally to FIGS. 7A-7B, an example, without limitation, is provided to allow users to utilize the system 10 to validate, challenge and/or discuss a reported community condition. The user computing device 12 may operate to view a previous post 40 having a photo of the community condition. The user may then select the validate button 42 in order to validate the post. The user may alternatively select the challenge button 44 in order to assert or challenge the accuracy of the previous report. The user computing device 12 may also display a discussion button 46 to allow users to engage in discussion over a particular post on a community condition. As depicted, the condition of yard maintenance lacking may then be discussed by a user selecting the discuss button, wherein the server is programmed to initiate a discussion interface delivered to the user computing device 12 as shown in FIG. 7B. The user may enter a comment as part of a discussion in text box 48. This allows for users to engage in location-based discussions, like GPS-based discussions on community conditions.

Embodiments may be available on or through the Internet, such as through domain names reserved and owned by Applicant that include community-rules.com, rulesai.com, homeownersrules.com, homeownersrule.com, rulescheck.com, hoagps.com, communityconcern.com, communityhazard.com, inthehoodreport.com, myhoodreport.com, neighborhoodhazard.com, watchyourstreet.com, zipcodehazard.com, or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

What is claimed is:

1. A community reporting system comprising:
a computer server having a memory for storing community condition information and community information; and
a user computing device coupled to the computer server, the user computing device configured to tag community condition information, wherein the computer server is programmed to:
receive from the user computing device a signal having tagged community condition information including a community condition in a corresponding community;
automatically send the tagged community condition information to other user computing devices coupled to the server that are within a predetermined population selected by the user computing device and automatically accumulate the tagged community condition information and aggregate the community condition within the memory to store the accumulated and aggregated information corresponding to the community information in which the community condition relates in response to processing the tagged community condition information;
maintain the community condition information stored in the memory of the computer server; and
automatically generate a report of community conditions in response to receiving a signal requesting a report, wherein the report segregates the community conditions based on the tagged community condition information.

2. The community reporting system of claim 1, wherein the user computing device includes a camera.

3. The community reporting system of claim 2, wherein photographs, videos or combination of photographs and videos taken with the user computing device are added to the community condition information stored by the computer server.

4. The community reporting system of claim 3, wherein the computer server is further programmed to aggregate information including the photographs, videos or combination of photographs and videos.

5. A community reporting system comprising:
a computer server having a memory for storing community condition information and community information; and
a plurality of user computing devices coupled to the computer server, the user computing device configured to assign a location to community condition information, wherein the computer server is programmed to:
receive from more than one user computing device signals having community condition information including a plurality of community conditions within a corresponding community, wherein each community condition is one of a positive community condition or a negative community condition;
automatically accumulate the community condition information from the more than one user computing device and aggregate the positive community condition and the negative community condition within the memory to store the accumulated and aggregated information corresponding to the location in which the community condition occurred in response to processing geotagged community condition information from each of the user computing devices;
maintain the community condition information stored in the memory of the computer server; and
automatically generate a report of community conditions in response to receiving a signal requesting a report, wherein the report segregates the community conditions based on the location associated with the community condition information.

6. The community reporting system of claim 5, wherein each of the plurality of user computing devices include a camera.

7. The community reporting system of claim 6, wherein photographs, videos or combination of photographs and videos taken with the user computing device are added to the community condition information stored by the computer server.

8. The community reporting system of claim 7, wherein the computer server is further programmed to aggregate information including the photographs, videos or combination of photographs and videos.

9. The community reporting system of claim 5, wherein the community condition information is geotagged with information provided by a global positioning system device of the more than one user computing device prior to receiving the community condition information by the computer server.

10. The community reporting system of claim 9, wherein the computer server is further programmed to aggregate information based on the geotagged community condition information.

11. The community reporting system of claim 5, wherein the server is further programmed to determine a rating for a geographic area around a location of the user computing device.

12. The community reporting system of claim 11, wherein the rating is determined by the server in response to analyzing community condition information associated with the geographic area around the location of the user computing device, the community condition information comprising a number of community conditions reported, a number of validations of the community conditions reported and length of time before remediation of community conditions reported.

13. The community reporting system of claim 5, wherein the server is further programmed to automatically determine whether community rules are violated by a reported negative community condition.

14. The community reporting system of claim 5, wherein the server is further programmed to allow the user computing devices to validate previously reported conditions, challenge previously reported, engage in a text discussion on previously reported conditions or combinations thereof.

* * * * *